Figure 6:
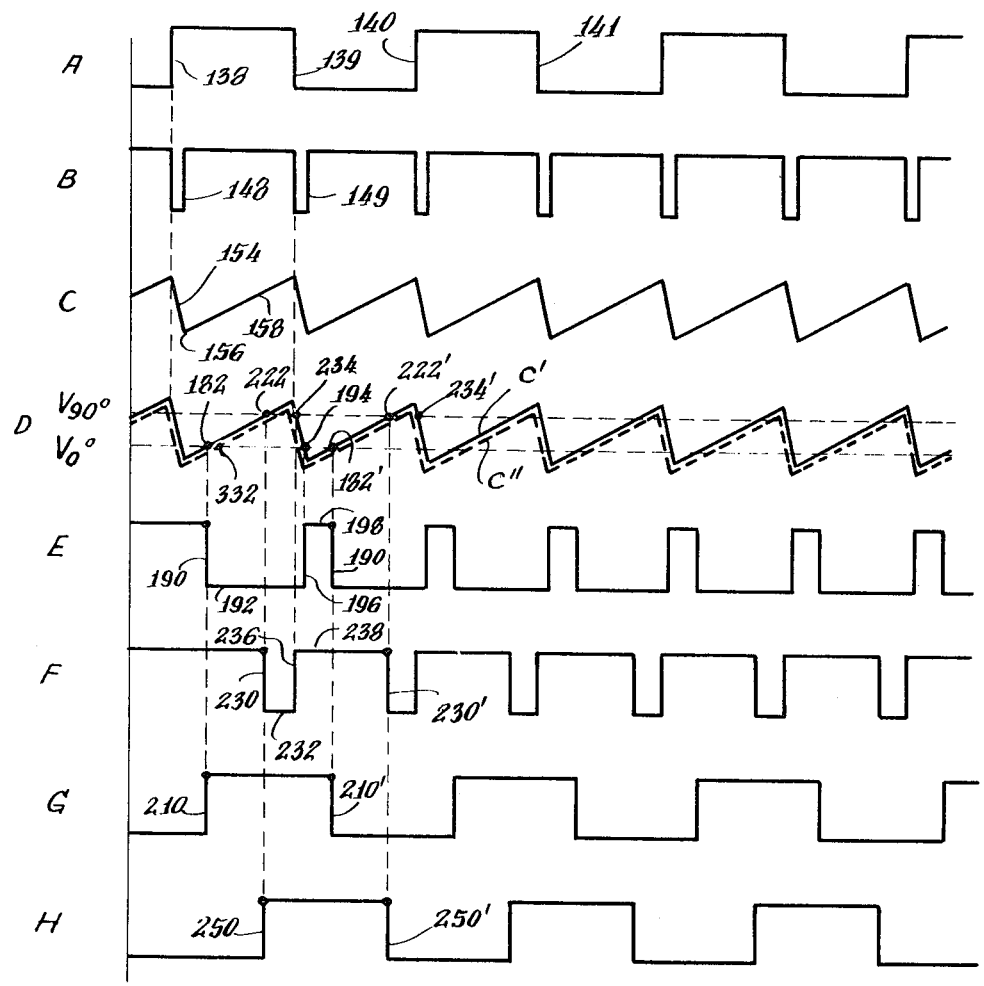

United States Patent

Vergato

[15] 3,659,942
[45] May 2, 1972

[54] DETECTOR CIRCUITS FOR PHASE COMPENSATION

[72] Inventor: Joseph A. Vergato, Monroe, Conn.
[73] Assignee: The Perkin-Elmer Corporation, Norwalk, Conn.
[22] Filed: Nov. 13, 1970
[21] Appl. No.: 89,166

[52] U.S. Cl............................356/51, 250/83.3 H, 250/220 SD, 356/95, 356/97
[51] Int. Cl..............................................G01j 3/42
[58] Field of Search.......................356/51, 88–97, 356/206, 212, 217; 250/43.5 R, 83.3 H, 220 SD

[56] References Cited

UNITED STATES PATENTS 3,183,764  5/1965  Sundstrom..........................356/95 X
3,257,562  6/1966  Erdman et al. ..........................356/95

Primary Examiner—Ronald L. Wibert
Assistant Examiner—F. L. Evans
Attorney—Edward R. Hyde, Jr.

[57] ABSTRACT

In double-beam optical testing instruments (e.g., spectrophotometers) in which a single radiation detector alternately receives radiation that has passed through two different optical paths, a separator or demodulator is utilized to separate the radiation detector electrical signal components into those representing the intensities of the radiation passing through each of the paths. The demodulator typically receives a synchronizing signal from the means causing the alternation of the two beams seen by the detector (typically one or more choppers having transparent and mirrored sectors). It has been found that when the size of the area of certain types of detectors receiving the radiation vary (caused, for example, by varying the entrance and exit slits of a monochromator in a spectrophotometer), the time lag in the electrical output of the detector varies. The present device provides means for compensating the phase of the synchronizing demodulator signal with such variation in the radiation detector time lag, as by utilizing a signal representative of the existing slit width to introduce a variable phase shift in the synchronizing demodulator signal.

12 Claims, 8 Drawing Figures

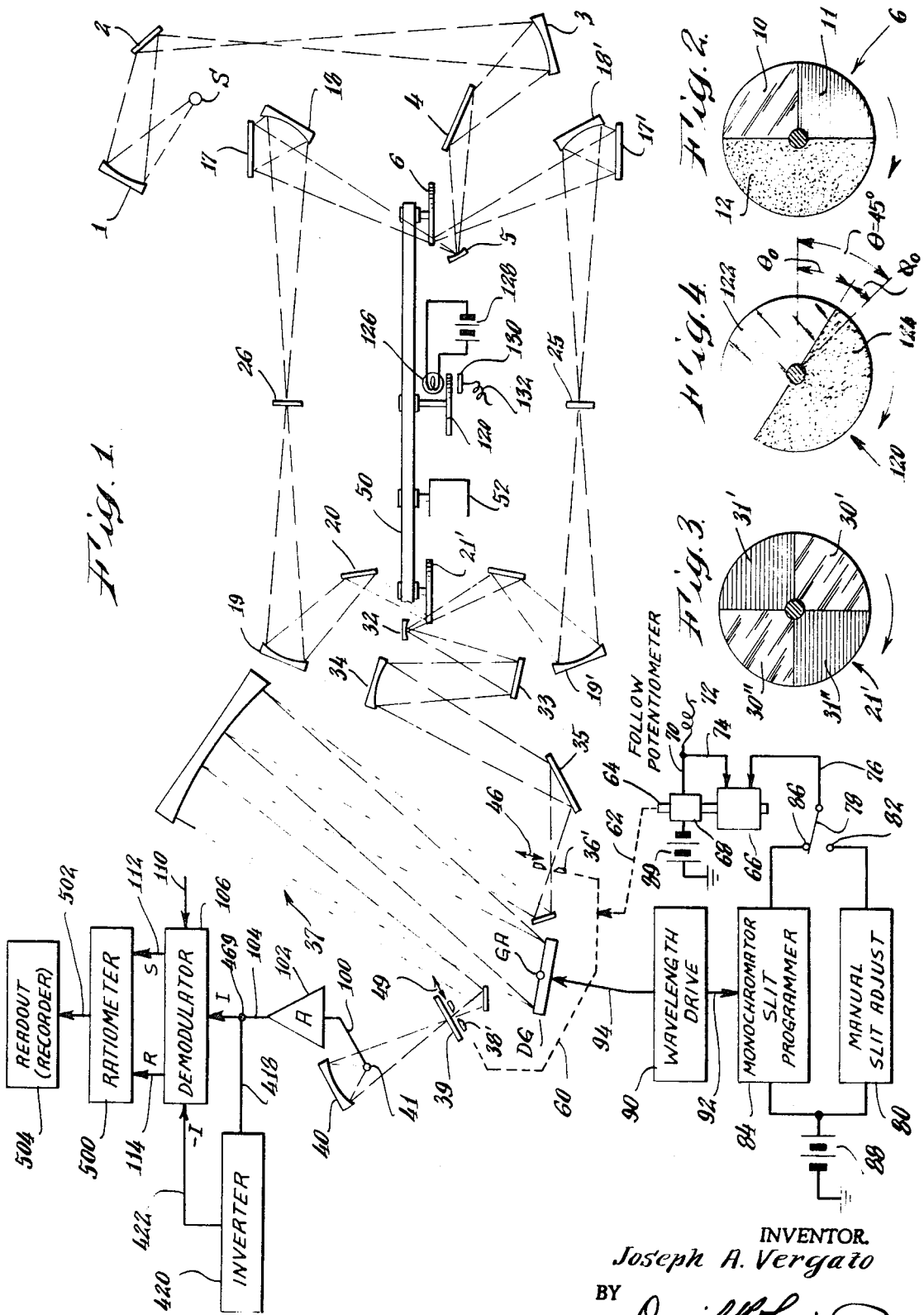

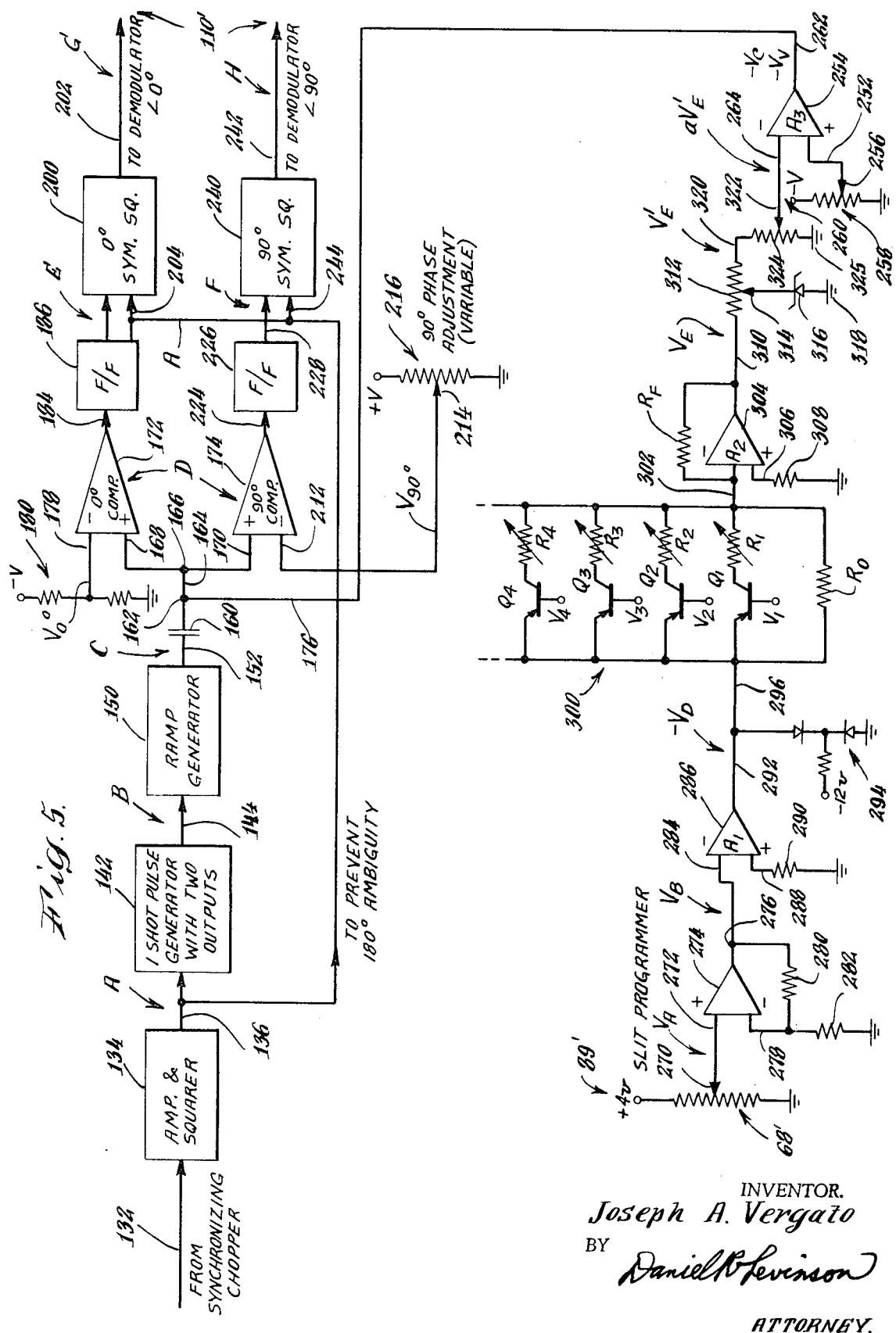

INVENTOR.
Joseph A. Vergato
BY Daniel R. Levinson
ATTORNEY.

INVENTOR.
Joseph A. Vergato
BY
Daniel K. Levinson
ATTORNEY.

DETECTOR CIRCUITS FOR PHASE COMPENSATION

GENERAL DESCRIPTION

This invention relates to so-called "double-beam" optical instruments, that is, of the type in which radiation following two different paths is made to alternately fall on a single radiation detector, and the signal components representative of the intensity of the two different path beams are separated from the electrical output of the detector. More particularly, the invention relates to such a double-beam instrument in which the radiation detector output signal undergoes a variable time lag, depending on the area of the detector actually receiving radiation and in which this area varies during normal utilization of the instrument, for example, a double-beam spectrophotometer in which the entrance and exit slits of the monochromator part are utilized at different widths, either by being "programmed" according to the wavelength setting of the scanning monochromator, or be other means, including a manual slit width control.

The invention compensates for the variable time lag of the detector according to the extent of its area that is "active" by providing a compensating phase shift in the synchronizing demodulator signal, which is originally synchronous to the means for causing the "beam switching" that is, the means for causing the detector to alternately "see" each of the two beam paths. In particular, the invention utilizes an electrical signal representative of the area of the radiation detector that actively receives radiation to introduce a variable phase shift in the synchronous demodulator signal to compensate for the variably "active" area of the radiation detector. For example, in a double-beam spectrophotometer, it is the variable width of the entrance and exit slits of the monochromator that determines the area of the detector receiving radiation; in such an instrument, an electrical signal representing the then existing width of the (typically identical) slits is utilized to shift the phase of the synchronous demodulating signal. More particularly, the signal representing the slit width (say, by being proportional thereto) is utilized to automatically introduce a variable phase shift in the synchronous demodulating signal, according to a predetermined or known function (not necessarily linear) so as to compensate for the variable time lag of the radiation detector as the area thereof is varied by the slit width.

Accordingly, a primary object of the invention is to provide compensation of the phase of the synchronous demodulating signal utilized to separate the signal components of the radiation detector of a double-beam optical testing instrument to compensate for the varying time lag caused by the varying area of the detector illuminated, because of variation in the size of some elements (e.g., optical slits) which limit the size of the beam ultimately reaching the detector.

A similar but more specific object of the invention is the provision of means for compensating the time lag of the radiation detector in a double-beam spectrophotometer by causing a phase shift in the synchronizing demodulation signal in accordance with the variable width of the optical slits forming the entrance and exit slits of the monochromator of the double-beam spectrophotometer.

Figure 7:
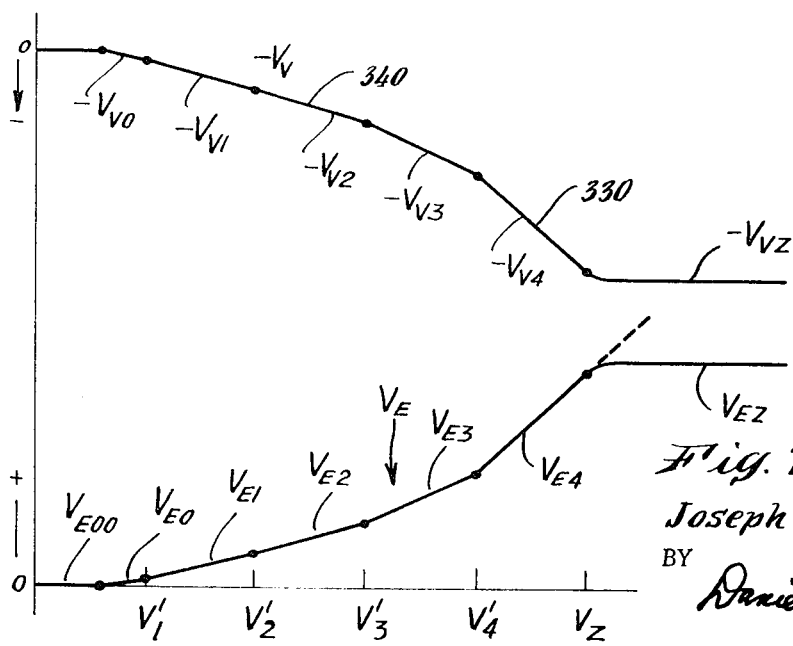
Figure 8:
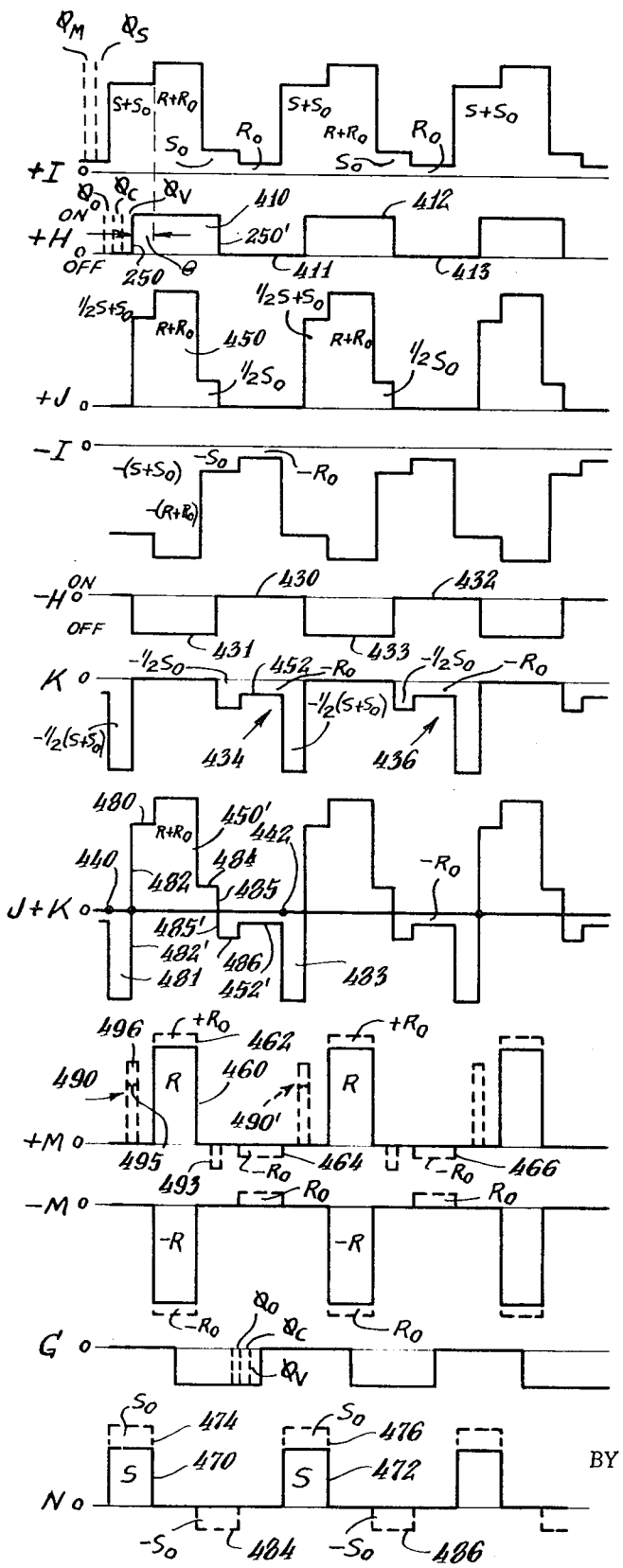

Other objects, features and advantages of the invention will become obvious to one skilled in the art upon reading the following detailed description of an exemplary embodiment of the invention, as it may be incorporated in, for example, a double-beam spectrophotometer, in conjunction with the accompanying drawings, in which:

FIG. 1 is a schematic plan view of an exemplary spectrophotometer, schematically illustrating both its main optical parts and those mechanical and electrical parts most closely related to or required by the invention;

FIGS. 2, 3, and 4, respectively, are somewhat schematic elevation views of the beam splitting chopper, beam reuniting chopper, and basic synchronous modulation chopper, respectively, of FIG. 1;

FIG. 5 is a schematic, partly in block form, of the electrical components causing the phase shift in the original synchronous demodulator signal in accordance with the width of the entrance and exit slits of the monochromator in FIG. 1, so as to compensate this synchronous demodulating signal for the variable time lag in the radiation detector caused by variation in the size of the area thereof which receives radiation;

FIG. 6 is a graphical representation of various signals formed at different parts of the circuit of FIG. 5;

FIG. 7 graphically shows at two different points in the circuit of FIG. 5, a typical phase-shifting electrical signal, generated to variably adjust the synchronous demodulating signal according to different slit width to compensate for the time lag caused by varying the utilized area of the radiation detector; and FIG. 8 is a graphical representation of how the final synchronizing demodulating signal may be used to separate out components in an idealizedly illustrated detector output signal, including indication of how phase lags in said detector output signal are compensated by phase lags including a variable phase lag $\phi_v$, introduced into the final synchronizing signal, so as to maintain a desired phase relationship between these two signals.

EXEMPLARY INSTRUMENT UTILIZING THE INVENTION

Purely for exemplary purposes, the invention is assumed to be utilized in a double-beam spectrophotometer of the type shown in British Pat. No. 1,157,086, published July 2, 1969, and corresponding to U.S. Pat. application Ser. No. 571,279, filed Aug. 9, 1966, now U.S. Pat. No. 3,542,480, both being assigned to Perkin-Elmer Limited, of England, a substantially wholly-owned subsidiary of the assignee of the instant application. In particular, all of the elements numbered no higher than "41" in FIG. 1 correspond exactly to the elements shown in FIG. 1 of said already-published British specification and corresponding U. S. application, except as noted hereinafter. The invention, of course, may be incorporated in not only other types of double-beam spectrophotometers, but in any type of double-beam optical testing instrument, i.e., any instrument in which two or more different radiation beams are caused to sequentially fall upon a single radiation detector, provided the area of the detector receiving the radiation is caused to vary in a known manner (e.g., by varying the width of the entrance and exit slits of the monochromator in the exemplary spectrophotometer of FIG. 1.

The parts of the exemplary spectrophotometer of FIG. 1 common to the already-published British specification in corresponding U.S. patent application will be briefly described first, since these obviously do not form any essential part of the present invention. Thus, radiation from an, say, infrared source S is focussed and deviated by mirrors 1, 2, 3, 4, and 5 onto a rotary beam splitting chopper 6, which is schematically shown in FIG. 2 as to comprise one transparent quadrant 10, one reflecting quadrant 11, and two successive quadrants 12 which are opaque and absorbing, so as to neither allow the radiation to pass nor significantly reflect it. When the radiation from mirror 5 falls on the transparent quadrant 10, it passes straight through the chopper 6 so as to be reflected consecutively by mirrors 17, 18, 19, and 20, so as to fall upon a beam recombining chopper or device 21'. This chopper 21', although corresponding functionally exactly to the beam recombining device 21 of said published British specification and corresponding copending U. S. patent application, is shown somewhat differently; in particular, instead of being driven at twice the angular rate or frequency of the beam-splitting device 6, it is assumed to be rotating at the same speed therewith, and therefore consists of alternately transparent and reflecting quadrants rather than only a single pair of semi-circular transparent and reflecting portions. This different structural (but identical functional) arrangement of the beam recombining device 21' is illustrated in the instant drawing, since it is both mechanically simpler and, more importantly, better illustrates the relationship between the beam-splitting chopper 6 and the recombining chopper 21', by direct comparison of FIGS. 2 and 3. Thus, when the transparent portion 10 of the beam-splitting chopper 6 is in the beam from mirror 5 as just described, one of the reflecting portions, namely, 31' in FIG. 3 of the beam recombining device or chopper 21', will intercept the beam from mirror 20 and reflect it to mirror 32 and therefore to the remaining, higher-numbered elements of the spectrophotometer of FIG. 1.

When the radiation from the mirror 5 falls on a reflective quadrant 11 of the beam-splitting device 6, it is reflected so as to strike mirror 17', and thence mirrors 18', 19', and 20', so as to encounter the beam recombining device 21' from the opposite side. Since, as just stated, it is assumed that in the instant FIG. 1 both the beam-splitting chopper 6 and the recombining device 21' are driven at the same angular rate, say, fifteen complete rotations per second (as by means of a common drive belt 50 driven by a motor 52), when the radiation is reflected by quadrant 11 of the beam-splitter 6, it will pass through a transparent quadrant, namely, 30' in FIG. 3 of the beam recombining device 21', thereby passing through this latter device to mirror 32. A sample, the characteristic absorption of which is to be measured, will be normally placed in one of the two paths, say, at 25, while a reference material may be placed in the other split beam as at 26.

When the rotary beam-splitting device 6 is in such angular position that the source radiation from the mirror 5 falls on either of the quadrants 12 (see FIG. 2) thereof, no radiation from the source passes along either of the two paths just described; however, reradiation from the elements in the "sample" and the "reference" paths will alternately be allowed to reach mirror 32 (and the other elements to the left thereof) during the periods respectively when the reflecting quadrant 31'' and the transparent quadrant 30'' at the recombining device 21' (see FIG. 3) are in the path leading to mirror 32. If the choppers rotate clockwise as indicated, a mirror 32 and all the elements to the left thereof in FIG. 1 will sequentially receive in four equal stages: first, source radiation passing thorugh the sample 25 together with any sample path reradiation; second, source radiation passing along the reference beam path together with any reference path reradiation; third, only reradiation from the sample path (the source radiation being blocked by portion 12 of chopper 6); and finally, only reradiation along the reference path (the source radiation still being blocked). As described in said published British specification and corresponding United States application, this allows discrimination against the sample reradiation (and the reference reradiation) so as to allow obtaining of signal components representative solely of the source radiation after passing through the reference path, free of reradiation effects. Since this ability to discriminate against reradiation in the two paths forms no part of the present invention per se, it is not described herein, except to mention that such ability may be preserved when utilizing the present invention as will be generally described subsequently.

It should be noted that if the two choppers 6 and 21' in FIGS. 2 and 3 are rotated in the opposite (counterclockwise) direction, then the four equal stages of radiation at mirror 32 in each (one-fifteenth of a second) full period will be in the order: source radiation passing through the reference (26) path together with any reference path reradiation; secondly, source radiation passing through the sample (25) path together with any sample path reradiation; thirdly, only reradiation from the reference path; and finally, only reradiation from the sample path. It may be seen that the different stages maintain their inherent characteristic that (relative to a whole one-fifteenth of a second cycle), the stages or components having any references radiation are in quadrature (i.e., 90° out of phase) with those having any sample radiation, and the two reradiation only signals are 180° out of phase with the corresponding signals including source radiation. Obviously, changing the direction of the rotation of the choppers therefore does not fundamentally affect the radiation "stage" relationships, so that substantially the same techniques of signal separation may still be used.

Whatever radiation reaches mirror 32 in the manner described above will, of course, be reflected thereby to mirrors 33, 34, and 35, so as to be imaged at the entrance slit 36' of the monochromator indicated generally at 37. According to the angular position of the diffraction grating DG of the monochromator, a particular wavelength or frequency (wavenumber) of substantially monochromatic radiation will pass through the exit slit 38' of the monochromator. Since a diffraction grating will cause different "orders" (i.e., harmonically related wavelengths or frequencies of radiation) to reach the exit slit 38', all but one of these "orders" (e.g., all but the first order) are eliminated by means of filters placed at 39 so that the radiation reaching the mirror 40 and focussed onto detector 41 is, in fact, substantially monochromatic. For infrared spectrophotometry, the detector 41 is of the thermally responsive type such as, for example, a thermopile, thermocouple, or bolometer. As previously stated, all of the elements numbered 41 or lower may be exactly the same as those described in the above-mentioned published British specification and corresponding U.S. patent application, except for the already noted functionally equivalent but structurally different beam recombiner 21' and the fact that the entrance and exit slits 36' and 38' of the monochromator are herein specifically assumed to be continually variable over at least a substantial range of width (e.g., from, say, 0.01 mm to 10 mm in width), this width variability being schematically illustrated at 46 and 49, respectively.

VARIATION OF DETECTOR AREA RECEIVING RADIATION

Means for adjusting these variable slits 36' and 38' is indicated schematically as a common mechanical means 60 moving the slits, which in turn is caused to move by the schematically illustrated mechanical drive 62, driven by shaft 64 of servo motor 66. A potentiometer 68 acts as a "follow" potentiometer in the servo loop controlling the slit widths, and is indicated in FIG. 1 as being of the rotary type directly on the motor shaft 64, but may be any type of potentiometer directly or indirectly connected to any of the elements (e.g., 60, 62, or 64) that follow the movement of the variable slits, so as to yield an electrical signal at its output 70 representing the position (that is, the size of the opening) of the variable slits 36', 38'. The output 70 of this potentiometer is available at slit width potentiometer output lead 72 for use in the invention, as well as being fed back at 74 to the servo motor 66 as the secondary or balancing input thereto. The primary or driving input to the servo motor 66 at 76 may be supplied through two-position switch 78, either from a manually adjustable potentiometer 80 (when switch 78 makes contact with terminal 82), or a programmed potentiometer (or series of potentiometers) 84, when the switch 78 is in contact with the other terminal 86 (as shown). Both the slit programmer and the manually adjustable slit potentiometer 80, 84 are supplied by a voltage source, such as common d.c., source 88, the follow potentiometer 68 also of course, being energized as indicated by source 89. As well known in the art, the monochromator slit programmer 84 will supply an electrical signal at its terminal 86 representative of the slit width desired to be used at each of the wavelengths to which the monochromator is scanned. Since the particular type of slit programmer 84 and the manner in which it is caused to generate the particular desired slit width signal at each wavelength forms no part of the present invention, programmer 84 is merely illustrated as being schematically controlled by the wavelength (or wavenumber) drive 90 by schematically illustrated means 92, the wavelength drive also, of course, controlling the wavelength of the radiation emerging from the monochromator as by rotating the diffraction grating DG about a grating axis (perpendicular to the plane of the paper) indicated at GA by any convenient means such as schematically illustrated at 94. Since only the availability from the auxiliary output at 72 of the follow potentiometer 68 is important to the instant invention, the other elements 62–94 are merely intended to be a schematic illustration of any of the various well-known techniques for programming according to wavelength (or wavenumber) the widths of the variable entrance and exit slits 36', 38'; as well as allowing manual adjustment thereof to a particular slit width (when switch 78 is moved to its lower position so as to connect contact 82 to input 76 of the servo motor).

The other elements in FIG. 1 not shown in the aforementioned published British specification and corresponding U.S. application include a preamplifier (and/or amplifier) for receiving the electrical signal at lead 100 from the detector 41 and feeding the amplified signal or the lead 104 to a synchronous demodulator 106. As is well understood in this art, the synchronous demodulator may be utilized to separate from the total detector signal, those signal components caused by the radiation passing through the sample 25 (say, at output 112 of demodulator 106) from those signal components caused by the radiation that passed through the reference, which will be separated onto the other output 114 of the demodulator. In order for the demodulator to "know" which components of the detector signal should be attributed to the sample path and which to the reference path, a synchronizing demodulating signal, supplying this information, must be introduced at the synchronizing input 110 of demodulator 106.

If the relative phase between the radiation beam switching (e.g., through sample 25 and reference 26) and the electrical signal components at, say, amplified output 104 of the detector were entirely fixed, the synchronizing input 110 could be supplied a signal representing the position of the choppers (e.g., 6 and 21') directly, in the manner at least analogous to that conventionally done in various types of double-beam optical systems. Such a signal could be obtained, for example, from an auxiliary synchronizing signal chopper 120, comprising a transparent semicircular portion 122 and an opaque semicircular portion 124 (see FIG. 4) driven at the same speed as the other choppers as by common belt 50. The synchronizing signal itself could be generated by means of a small light source 126 (see FIG. 1) constantly energized as at 128, so that the chopper 120 would alternately cause energizing of a small detector 130 (for example, a solar cell), the electrical output of which at 132 could then be utilized (after suitable amplification and the like) as the synchronizing input at 110 of demodulator 106. It may also be noted that if only a fixed phase change occurred between the beam switching caused by the optical choppers (6, 21') and the amplified detector signals at 104, such a fixed phase change could be introduced by relative rotative off-setting of the synchronizing chopper 120 or by some simple delay means positioned in the circuit between the output 132 of the synchronizing detector and the synchronizing input 110 to the demodulator.

PHASE SHIFT COMPENSATION

However, the invention is directed to the more complex problem of supplying a variable phase change, the variation in the phase change being caused by (and therefore being a function of) the variable width of slits 36' and 38', which causes a variable area of the detector 41 to receive energy, causing a variable time lag in the detector output at 100 (and, therefore, 104). Many radiation detectors exhibit a phase lag which often varies with different conditions including the particular area and size of the area of the detector actually receiving radiation. For example, it has been found that thermally-responsive detectors at 41 (as used for example, to detect infrared radiation), and in particular those of the thermopile, thermocouple, or bolometer type, exhibit an increasing time lag in their electrical output as the area thereof receiving radiation increases from a small area to a moderately large one (although there appears to be little such effect at the two extremes). This variation in phase shift (lag) is typically different, not only for detectors of different types, but even for different detectors of the same type (and even from the same manufacturer). For example, in a particular spectrophotometer using a particular type of thermopile, variable phase shifts (lags) typically occur in the detector output for monochromator slit widths of more than about one millimeter (1 mm), but both the exact manner in which the phase lag increases with increasing slit widths and the maximum value (beyond which the phase lag ceases to increase with further slit width increase) typically varies somewhat for even nominally identical thermopiles. In order to compensate for this phase shift in the detector output (and, in particular, in the amplified output thereof at 104), the invention provides means for introducing a similar phase shift in the synchronizing signals supplied at 110 to the demodulator. An exemplary preferred manner for adjusting the phase of the final synchronizing demodulator signal supplied at 110 is schematically illustrated in FIG. 5, (which produces the various waveforms shown in FIG. 6), as to produce a phase shift of the final synchronizing demodulating signal with varying slit width to compensate the corresponding phase shift of a particular detector, as will be explained for relative to FIG. 7.

In FIG. 5, the output 132 of the synchronizing detector 130 is amplified and made a square wave signal as schematically illustrated at 134 so as to emerge at the output 136 of this circuit as a square wave A shown in FIG. 6. This square wave A will complete one entire cycle (i.e., from 138 to 140 in FIG. 6) for each complete rotation of the synchronizing chopper 122 and therefore for the other two choppers 6 and 21', all of which are rotating at the same angular rate, exemplarily assumed to be 15 complete rotations a second (i.e., a 15 Hertz rate). This symmetrical square wave is then sent to a one-shot pulse generator at 142 of a type that causes a pulse to be generated at its output 144 not only when the squared synchronizing waveform A increases (as at 138, 140, etc.), but whenever the waveform A decreases (at 139, 141, etc.), so that two evenly-spaced pulses 148, 149 (etc.) are generated at outputs 144 for every complete cycle of the synchronizing signal A. Each of the pulses (148, 149, etc.) supplied to the input of a linear ramp generator 150, causes the ramp generator output 152, as shown by waveform C in FIG. 6, to be rapidly reset (as shown at 154) to its lowest value (156) and then to linearly increase as indicated at 158. Thus, the ramp function C is generated twice (e.g., at a 30 Hertz rate) for each full fundamental period of the synchronizing signal A as may be clearly seen in FIG. 6. The ramp signal output C at 153 is capacitor-coupled, as at 160, to a common or summing point 162, which in turn is connected by lead 164 to common input point 166 connected to the (say, plus) inputs 168, 170 of the 0° and the 90° comparators or differential amplifiers 172, 174 respectively.

It will be temporarily assumed that only a constant voltage is supplied to summing point 162 over lead 176 by the lower parts of the circuit (which, in general, is not true, since these lower portions of the circuit usually supply a variable d.c. voltage over lead 176, which causes the automatic phase adjustment to compensate for the different width of the slits and, therefore, the variable size of the detector area receiving radiation). Under such assumption, the ramp voltage shown at C will be merely raised or lowered a fixed amount by the fixed voltage supplied at 176, so that the C' ramp voltage shown in the composite signal D in FIG. 6 is identical to the ramp voltage C except that its d.c. level has been varied by (the temporarily assumed to be constant) d.c. voltage added thereto by lead 176. The upper (negative) input 178 to the 0° comparator amplifier 172 may be supplied by a fixed voltage divider indicated generally at 180 so as to supply a relatively low voltage (e.g., minus 2.4 volts) at $V_0°$ (the level of which is also indicated at D in FIG. 6) to the upper (negative) input 178 to the 0° comparator 172. Whenever the ramp voltage exceeds the value of $V_0°$ as illustrated at the exemplary point 182 in FIG. 6, the output of the comparator amplifier 172 at 184 will change states (in this case, for example, become positive) so as to change the state of flip-flop 186, thereby changing the output 188 of the flip-flop to the opposite state as indicated by waveform E at 190 (in this case, causing the flip-flop to assume a "low" output at 192). The flip-flop 186 will be reset when the ramp voltage C' again falls below the value $V_0$ as at point 194 in FIG. 6 (thereby causing the return of the flip-flop output to the "high" state as indicated at 196, 198. However, it is the change to the "low" state indicated at 182, 190 (182', 190', etc.) that is utilized to generate the 0° synchronizing demodulator signal G. In particular, the output 188 containing the signal E is fed as the main input to the 0° symmetrical squaring circuit 200 which supplies the final 0° synchronizing signal G at its output 202. The auxiliary or control input 204 to circuit 200 is supplied with the original chopper synchronizing signal A to avoid a 180° ambiguity in the output G of circuit 200. In other words, the controller auxiliary input 204 may be considered an enabling input to circuit 200 insuring that its output G only goes "high" as at 210 in FIG. 6 when a descending signal as at 190 in main control signal E (rather than having the inverse relationship of the signal G going positive, rather than negative as at 210' on the next downward portion 190' of signal E). Thus, the auxiliary or control input 204 assures that the final 0° synchronizing signal goes "on" or becomes, say, "positive" (at 210) during the time the original chopper signal A is "on" or "positive" when the E signal changes from "positive" to negative (at 190), so that the G signal "lags" the original chopper signal A (rather than leads it) by a moderate angle. Circuit 200 may be considered merely a bi-stable flip-flop which is caused to change its state only when its main input 188 (i.e., signal E) goes from high to low, but its output at 202 (signal G) can only go from low to high (as at 210) only when the secondary or control input 204 (signal A) is high.

Since the operation of the 90° comparator or differential amplifier 174 is quite similar to that of the 0° comparator 172 already described, the signals D in FIG. 6 have superimposed thereon the $V_{90°}$ level supplied at the (negative) lower input 212 to 90° comparator 174. Although the operation of comparator 174 and the circuits following it are substantially the same as that already described for 0° comparator 172 (and its associated circuits), there is one substantial difference. The d.c. voltage $V_{90°}$ supplied at input 212 is not a fixed voltage but is finely variable for calibration purposes, so as to insure that the crossing point at 222 in FIG. 6 is exactly 90° (referred to the full period of signals such as A, G, or H) after crossing point 182, which, of course, corresponds to one-half of the horizontal length (time) of each of the two ramps generated per complete cycle. Thus, the level of $V_{90°}$ indicated in FIG. 6 is initially adjusted to insure this relationship, such adjustment being shown in FIG. 5, by utilizing as the $V_{90°}$ voltage at input 212, that obtained at the variable tap 214 of a variable potentiometer 216.

It should be noted that this adjustment need only be made once, typically at the factory, since the horizontal distance between points 182 and 222 at D in FIG. 6 will then be invariable so long as the slope of the ramp generator signal is invariable, even if the level of the entire signal C' is made to vary. In other words, although the exact position of crossing points 182 and 222 in FIG. 6 will vary if the signal C' is raised or lowered in d.c. level, the relative horizontal distance (i.e., the time) therebetween does not vary after adjustment of $V_{90°}$ is completed. Thus, adjustment of the d.c. level of the ramp voltage signal C' will cause an identical time shift in both crossing points 182' and the corresponding points 182' and 222'). Thus, the 0° signals E and G already fully described will shift, as well as the corresponding 90° signals F and H in FIG. 6 analogous thereto, which is therefore only briefly described immediately hereinafter.

Except for the above-noted fact that the input 212 to the 90° comparator or differential amplifier 174 is variable for initial calibration purposes, its operation and the operation of the circuits controlled thereby are so analogous to those already described to those of the 0° comparator 172, only a brief description of the 90° circuits and operations will be given. Thus, whenever the output of circuit 174 goes positive, by the ramp voltage input C' exceeding the $V_{90°}$ signal at such points as 222, 222', etc., this input 224 to flip-flop 226 will cause its output 228 to go from high to low as indicated 230, 230' in waveform F in FIG. 6. The low state 232 will be maintained only until the ramp voltage recrosses the $V_{90°}$ voltage level (when a ramp generator is being reset) as at points 234, 234', which recrossing (since it changes the polarity of the input at 224 to the flip-flop 226) all cause resetting of the flip-flop so as to cause its output at 228 to again go high as indicated by waveform F in FIG. 6 at 236, 238. The output of the flip-flop at 228 is fed as the main input to the 90° symmetrical squaring circuit 240, so that the output 242 of circuit 240 will in general change its state. In particular, because of the presence of the original A signal on the auxiliary or control input 244 to the circuit 240, only those high to low changes in signal F such as at 230 occurring when A is "high" will cause a change from low to high of the output signal H as at 250, so that the next downward change (high to low) of this signal F at 230' will necessarily cause the change of from high to low as indicated at 250' in the 90° synchronizing signal H. In other words, as previously explained relative to signals E and G, the enabling or control signal A at input 244 in this case assures that the 90° synchronizing signal H goes "on" or becomes "positive" (at 250) during the time the original signal A is "on" or "positive" and the F signal becomes "negative" (at 230); therefore, the H signal "lags" the original chopper signal A by more than 90° but less than 180°, thereby necessarily lagging the 0° synchronizing signal G by exactly 90° (assuming that the potentiometer 216 has been correctly adjusted).

The parts of the circuit and their operation so far described thus cause one signal (namely, the 0° synchronizing signal G) to "lag" the chopper signal A by an amount determined by the relative voltage of the modified ramp voltage C' (as well as, of course, the initially chosen values for $V_{0°}$ ); and additionally insure that the 0° synchronizing signal G and the 90° synchronizing signal H (which will be used for synchronously demodulating or "gating" the detector signal so as to separate the electrical components representing the sample and reference beam intensities) are exactly 90° apart.

The remaining parts of the circuit shown in FIG. 5 are utilized so as to adjust the phase of the 0° and 90° signals together, that is, both (waveform E and therefore) final signal G and (waveform F and therefore) final signal H, relative to the original chopping signal A, and therefore relative to the actual time the radiation reaches the detector 41 in FIG. 1 (not only to introduce a fixed time lag to compensate for any fixed time lag caused by the detector and the various circuits, but more importantly), to adjust automatically the variation in the time lag caused by variation of the width of the slits (36', 38' in FIG. 1) causing the attendant change in the exposed area and therefore the time lag of the detector 41. As previously implied, this (fixed as well as) varying time lag may be accomplished by adding a d.c. signal at 176 to the original ramp signal C in FIG. 6 so as to change the voltage lever of the entire signal in a vertical direction, so as to cause a (horizontal or time) movement of all of the crossing points shown in D of FIG. 6 by an identical amount, so as ultimately to change the phase of both signals G and H by an identical amount. This fixed or initial phase adjustment may be made by supplying to the (positive) lower input 252 of a differential amplifier 254 (used merely as a summing amplifier) a relatively fixed or calibration negative voltage for manually adjustable tap 256 of a potentiometer 258 supplied with a negative energizing voltage as indicated at 260. Adjustment of potentiometer 258 will therefore cause a negative initial or calibration signal to appear in the output 262, indicated as $-V_C$ so as to cause the original signal C in FIG. 6 to be lowered by this constant negative d.c. voltage $(-V_C)$. Thus, the signal C' shown at D in FIG. 6 is assumed to be the original ramp voltage C lowered by this fixed negative voltage. It will be originally apparent from FIG. 6 at D and from the previous discussion, that if no such voltage $-V_C$ were added to the original ramp voltage C at summing point 162, then C' would in general be higher (i.e., more positive at all points), so that the crossing points at 182, 222, etc., would have been more to the left than those shown. Thus, the effect of adding the negative calibration voltage $-V_C$ to the ramp voltage C to form the lowered ramp voltage C' is to cause the crossing points, such as 182, 222, etc., to move to the right, thereby ultimately introducing a fixed lag in (the intermediate signals E and F respectively and therefore) the synchronous demodulating signals G and H, respectively. It may be noted that the adjustment of the potentiometer 258 and therefore the negative signal $-V_C$ at 262 in FIG. 5 may be considered a fine initial or calibration adjustment, in that a coarse phase adjustment between the synchronous demodulating signals and the actual radiation beam switching choppers 6 and 21' in FIGS. 1-3 may be caused by intentionally introducing a phase change in the synchronous signal chopper 120 as shown in FIG. 4. In particular, if all of the choppers in FIGS. 2-4 are assumed to be rotating clockwise (as seen by the radiation falling thereon), in one type of synchronous demodulation the synchronizing chopper 120 may be intentionally caused to lead the beam-switching choppers 6 and 21', as indicated by the angle $\theta$. In one particular type of synchronous demodulation as will appear hereinafter, it is desired to make the final (180° long) synchronizing demodulating signals G and H symmetrically straddle the (only 90° in length) signals intended to be separated, so that the synchronous demodulating or gating signal G in FIG. 6 is intentionally made to "turn on" at 210 45° before the (only 90° long) signal it is intended to extract, and to "turn off" at 210, exactly 45° after this 90° long signal, the fact that the signals are only 90° in length in this exemplary embodiment being seen by the signals in FIGS. 5-7 in the aforementioned published British specification and corresponding U.S. application, as will be explained hereinafter, relative to FIG. 8 herein.

VARIABLE PHASE SHIFT COMPENSATION

Returning to the lower part of FIG. 5, the variable phase shift signal, utilized to compensate for the phase shift (lag) caused by the variable (increasing) area of the detector exposed by the variable (increasing) width of the slits in FIG. 1, is ultimately fed to the upper, negative, input 264 of the amplifier 254. How an appropriate variable signal is generated by the remaining parts of the FIG. 5 circuit will now be explained, starting at the lower left-hand corner of this circuit.

The follow potentiometer 68, indicating the width of the slits in FIG. 1 is schematically illustrated as a linear variable potentiometer 68' in FIG. 5, energized at 89' by an exemplary voltage (say, 4 volts). The position of the variable tap 270 (the position of which, of course, will be directly determined by the existing width of the slits 36' and 38' in FIG. 1) will therefore supply a voltage which is a (say, linear) function of the width of the slits. For purposes a simplicity of illustration, the potentiometer 68' is illustrated as a linear potentiometer, but, in fact, the voltage obtained at the variable output tap 270 will not in general be a linear function of the width of the slits, either by utilizing a non-linear potentiometer or by utilizing non-linear connections (as schematically illustrated at 62 in FIG. 1) between the potentiometer and the slits. Merely for exemplary purposes, it is noted that in one embodiment of the invention actually constructed, a 0.01 mm slit width yielded a 0.05 volt output at the variable tap 270, a 0.1 mm width yielded 1.11 volt output, a 1 mm width yielded a 2.23 volt output, and a 10 mm width yielded a 3.35 volt output at the variable path 270. The voltage $V_A$ at the variable tap 270 is utilized as the upper (positive) input 272 to a differential amplifier 274, used as a buffer amplifier, which, in general, will at least somewhat modify the input voltage. For example, for the four values previously given (of 0.05, 1.11, 2.23, and 3.35 volts) at 270, 272, the output of the amplifier at 276 had the respective values of: 0 volts, 1.33 volts, 2.66 volts, and 4.00 volts, because of the buffering provided by the feed-back loop to the lower (negative) input at 278 by the path through resistor 280, the input being connected to ground through a different resistor 282. The buffered output voltage, $V_B$, at the output 276 of the buffering amplifier 274 is then further amplified and inverted, as by being fed to the upper (negative) input 284 of the differential amplifier 286, the lower (positive) input 288 to which is grounded through a resistor as indicated at 290. The output 292 of the amplifier 286 is therefore a negative signal, indicated at $V_D$ when the input $V_B$ is greater than zero. It may be noted that most of the various (conventional) feed-back loops for all of the amplifiers in FIG. 5 have been omitted, since the exact design of these amplifiers (including not only those just described, but also those described earlier in the specification and those about to be described) form no part of the present invention as such. Similarly, other means well known in the electrical circuit art, including the couplings between amplifiers and other details, are likewise omitted for similar reasons. As an example of a somewhat more important detail, a clamping means is shown at 294 connected to the output 292 of amplifier 286 so as to insure that the signal thereon is prevented from changing until the input voltage $V_B$ increases beyond a predetermined value (corresponding to a particular minimum slit width at which a variable phase shift starts to occur). Thus, the output voltage $-V_D$ is clamped to a particular value, e.g., zero volts, until the slit width reaches that size at which the variable phase compensation is desired to commence. Other less important details of the circuit have been omitted.

In the exemplary somewhat diagramatic circuit illustrated, the negative signal, $-V_D$ at output 292 is supplied as an input to a circuit 300, comprising in this example five parallel paths to the input 302 of amplifier 304. In particular, the exemplary circuit 300 includes a lowermost path through a relatively high resistor $R_o$, as well as four additional possible parallel paths through, respectively, transistor Q1 and variable resistor R1; transistor Q2 and variable resistor R2; transistor Q3 and variable resistor R3; and transistor Q4 and variable resistor R4. The circuit 300 acts as the input resistance (over lead 302) to the amplifier 304. As is well known, the ratio of the feedback resistor $R_F$ to the effective input resistor (i.e., circuit 300) determines the effective gain of the circuit including amplifier 304. For small (absolute) values of the signal $-V_D$, the relatively high resistor $R_o$ acts as the input resistance, so that the circuit will produce a relatively low gain signal ($V_E$) at its output 310. As the input voltage $-V_D$ increases, it will cause sequentially each of the transistors Q1, Q2, Q3, and finally, Q4, to also become conducting (e.g., as $-V_D$ exceeds the different voltages $V_1$, $V_2$, $V_3$, and $V_4$, respectively, applied to the base of each of the transistors). In other words, each of the transistors Q1-Q4 acts as a switch which only closes when the voltage $-V_D$ exceeds the respective voltages $V_1$, $V_2$, $V_3$, and $V_4$, in turn. Closing of each of the switching transistors will, of course, lower the total effective resistance of the parallel circuit 300. In particular, the effective resistance of circuit 300 (acting as the input resistor to amplifier 304) will decrease by steps every time another of the transistors becomes conducting, so as to add an additional parallel resistance path ($R_1$, $R_2$, $R_3$, and $R_4$, in turn). This step-wise decrease in the effective input resistance to amplifier 304 will, of course, cause a step-wise increase in the gain of the amplifier circuit, so that $V_E$ will tend to increase in a manner as shown by the lower curve in FIG. 7. In particular, as an increase in input $-V_D$ causes each of the transistors to become conducting, $V_E$ will increase by higher and higher gain factors relative to $-V_D$. Thus, the amplifier circuit as a whole, acts as a step-wise variable gain amplifier in which the gain increases (in a step-wise manner) with increasing input. The low (positive) input 306 of amplifier 304 is grounded through resistor 308 in order to balance out the effect of the amplifier input bias currents, as is conventional. The negative input signal $-V_D$ will therefore appear at the final output 310 of the circuit as a positive voltage, $V_E$. The various parallel paths of circuit 300 may thus be thought of as causing a step-wise decrease in the effective input resistance (between leads 296 and 302) so as to change the gain of the composite circuit made up of the circuit 300 and the amplifier 304 and its associated elements (especially feedback resistor $R_F$).

Thus, the effect of the original voltage $-V_D$ increasing in absolute value (i.e., going from zero to more and more negative values) will be to cause the final output at 310, indicated at $V_E$ in FIG. 5 and shown in FIG. 7 to increase not in a linear manner, but according to a series of line segments having increasing slope as may be readily seen in the curve $V_E$ in FIG. 7. In particular, as long as the original voltage $-V_D$ is below that (hereinafter referred to as V1') necessary to render the first transistor Q1 conducting, having a voltage V1 applied to its base, the final output voltage $V_E$ will follow the very slightly sloped line segment $V_{E0}$, since none of the transistors will be conducting and therefore, the only pass will be through the relatively large fixed resistor $R_0$. It may also be noted that as long as $-V_D$ is zero (which will occur over a range of small slit openings in the exemplary embodiment as indicated above), $V_E$ (at $V_{E00}$) will be zero. Merely for exemplary purposes, it is assumed $-V_D$ departs from zero (i.e., becomes actually a negative signal) at a value just before the first transistor Q1 is switched on. In this case, the $V_E$ signal will remain at zero, as shown at $V_{E00}$, until just before Q1 is switched on (at V1'), so that there is a short non-zero line segment, $V_{E0}$, of very small slope (the input resistance to amplifier 304 being determined by the full value of $R_0$) before this switching on of Q1 occurs. When the voltage at $-V_D$ increases (i.e., becomes more negative) sufficiently to render the first transistor Q1 conducting, the effective resistance of circuit 300 will then become lower, since it will now comprises resistor $R_0$ and variable resistor $R_1$ in parallel, so that the gain of the amplifier circuit including amplifier 304 increases to a higher value. The final output $V_E$ will therefore (to the right of point V1') follow a more rapidly increasing straight line segment (i.e., one of greater slope than $V_{E0}$) indicated at $V_{E1}$. In an analogous manner, as the voltage $-V_D$ increases in turn beyond the respective voltages $V_2'$, $V_3'$, and $V_4'$, causing the respective transistors Q2, Q3, and Q4, to become conducting, the voltage $V_E$ will increase according to the more rapidly increasing line segments $V_{E2}$, $V_{E3}$, and $V_{E4}$, respectively. The voltage $V_E$ continues to increase (according to the slope of the last line segment $V_{E4}$). However, a resistor 312 is connected by a variable tap 314 through a zener diode 316 to ground at 318, so that the voltage $V_E'$ on the output or right-hand lead 320 from the resistor 312 will never be allowed to exceed a certain respective voltage determined by the breakdown voltage of zener diode 316 and the chosen position of variable tap 314. Thus, the voltage on output lead 320, indicated at $V_E'$ will be proportional to $V_E$, but will be limited to some maximum value because the voltage at tap 314 never exceeds a certain value determined by the zener diode just mentioned. The voltage $V_E'$ will therefore be held to some zener-limited voltage, for example, that indicated by straight line portion $V_{EZ}$ in FIG. 7 starting at abscissa value $V_Z$ for a particular zener and position of tap 314. Since the voltage $V_E'$ to the left of $V_Z$ will be of the same form (that is, exactly proportional) to the voltage $V_E$ shown in FIG. 7, this later (shown) voltage may be thought of as showing the form of the voltage $V_E'$ as well (except for a constant change in scale). The voltage $V_E'$ is then fed to the previously mentioned input 264 of amplifier 254 by means of a variable scaling potentiometer, the proportion of signal $V_E'$ being fed to said input being determined by the position of variable tap 322 along the resistive element 324 (grounded at 325) of this potentiometer.

The actual signal provided to the upper (negative) input 264 and the amplifier 254 will therefore be an electrical signal equal to $aV_E'$ where a is the attenuation caused by the particular position of tap 322 (that is, a is between zero and one). The output 262 at (linear) amplifier 254 will therefore contain a signal, $-V_r$ indicated at the top of FIG. 7, having the opposite sign of but otherwise being similar in shape to not only $aV_E'$, but also $V_E'$ (and $V_E$ to the left of $V_Z$). The corresponding segments of the $-V_r$ signal in FIG. 7 are therefore labeled $-V_{r0}$, $-V_{r1}$, $-V_{r2}$, $-V_{r3}$, $-V_{r4}$, and $-V_{rz}$. It may be noted that the individual slopes of those segments of both signals including the subscript of 1, 2, 3, or 4, may be adjusted by varying the individual resistors $R_1$, $R_2$, $R_3$, and $R_4$, in the circuit 300; while the limiting voltages ($V_{EZ}$ and therefore $-V_{rz}$) may be varied by moving the tap 314. Finally, the proportionality value between the entire final variable phase adjustment voltage $-V_r$ may be changed relative to $V_E$ (and $V_E'$) by adjusting the attenuating factor provided by the tap 322 at the voltage dividing resistor 324. Thus, the exemplary embodiment allows the final variable phase adjustment voltage ($-V_r$) to be adjusted so as to conform it quite closely to the phase lag curve of a variety of detectors occasioned by the increase in the detector area utilized, for example, by opening the slits 36', 38' in the exemplary instrument of FIG. 1. It may also be noted that the reason that the zener-limited part of the curve ($-V_{rz}$ caused by the leveling at $V_{EZ}$) is introduced is that it has been found that for at least in some types of detectors utilized in an exemplary instrument, no additional phase lag occurs at the output (e.g., 100 or 104 in FIG. 1) after the slits have been opened a certain extent (for example, a slit width of 6 mm in the exemplary slits previously mentioned).

As previously noted, the fixed compensating voltage $-V_C$ at the output 262, caused by the lower (positive) input at 252 of the differential amplifier 254 is utilized to provide a fine adjustment of the desired relatively fixed phase shift of the synchronous demodulating signals relative to the detector signals (104 in FIG. 1), not involving any variable phase shift (and in particular, the phase lag in a detector signal as the slit width is increased and the detector area utilized is therefore similarly increased). It is the variable signal $-V_r$ which introduces this variable additional phase adjustment so as to cause a variable change in the entire level of the ram signals such as shown at C' in FIG. 6. For example, if the slits have been opened to a width such as to generate a variable phase adjustment signal ($-V_r$) corresponding to point 330 in FIG. 7, the ramp voltage C' will be further depressed by this negative voltage so as to assume the position shown in dashed lines at C'' in FIG. 6. Since this depressed ramp voltage C'' will obviously cross the fixed voltage levels $V_{0°}$ and $V_{90°}$ at a point in time later than the corresponding crossing points 182 and 222 (for the C'' ramp signal), all of the waveforms corresponding to E, F, G, and H, in FIG. 6 will occur at a later time, namely, the time given by the horizontal distance between the original and new crossing points, such as 182 and 332 in the waveforms D in FIG. 6.

In recapitulation, the so-called fixed phase shift compensation signal $-V_C$ will be "added" to the ramp voltage signal C in FIG. 6 so as to diminish its d.c. voltage to adjust it (as determined by crossing point 182) to cause initiation of the E and therefore, the G 0° synchronizing demodulating signals at the proper time relative to the one set of major signal components in the composite detector signal 104 introduced to the demodulator; while the additional variable phase shift signal $-V_r$ will variably (further) depress the original ramp voltage C as the slits are open according to the function shown at $-V_r$ in FIG. 7 to compensate for the variable further phase shift (lag) caused as the slit width is increased and therefore a larger area of the detector receives radiation. It may be noted that the full-line signal C' previously discussed need not be the original ramp voltage uniformly depressed by only the fixed calibrating voltage $-V_C$, but may already have been depressed by some typical value of variable lag (such as that at 340 in FIG. 7) of the variable phase shifting voltage $-V_r$. It is again noted that the synchronizing chopper 120 may be adjusted in phase (relative to the optical choppers 6 and 21') to effect coarse adjustment horizontally of the original ramp voltage C (by moving horizontally the synchronizing chopper signal A and therefore the ramp voltage setting and resetting signal B in FIG. 6 to insure that only a moderate value of the relative fixed phase adjustment signal $-V_C$ need be utilized from adjustment of the potentiometer 256, 258 in FIG. 4, so that no utilized value of the variable phase shift signal $-V_1$ will synchronizing the ramp voltage (C', C'', etc.) as modified thereby to fail to cross both the $V_0°$ and the $V_{90}°$ voltage levels.

OPERATION

Although the operation of the device has been described along with the structure of a partly diagrammatically shown exemplary embodiment, the operation will be briefly summarized. First, the synchronizing chopper 120 may be angularly adjusted relative to the two optical choppers (which are assumed to be exactly in phase with each other in the manner illustrated in FIGS. 2 and 3) to introduce (if desired) a coarse phase (lag) shift adjustment indicated at $\phi_0$ in FIG. 4. In the particular demodulation scheme preferably utilized in the FIG. 1 instrument, the intentionally introduced phase lead $\theta$, which is 45° in an exemplary demodulating scheme so as to cause the demodulating signals of 180° in extent to be exactly centered about each of the 90° long signal components intended to be extracted, may also be introduced, but this has nothing to do with the phase lag problem to which the present invention is directed. The phase lag component $\phi_0$ indicated in FIG. 4 introduced by off-setting of the chopper may actually be 0° if the phase lag of the detector 41 and its associated amplifier circuit 102 is relatively small, the phase lag caused by the $-V_C$ signal (such a phase lag hereinafter referred to as $\phi_C$) being utilized exclusively to introduce this phase lag (i.e., the phase lag at minimum slit width). However, to treat the most general case, it will be assumed that the chopper 120 has an angular phase lag of $\phi_0$ from the theoretical "correct" position (in this case at a $\theta$ lead angle) as a coarse adjustment for desired minimal phase lag (or even as an error in the angle adjustment of the chopper 120, in which case $\phi_0$ not only could be substantially different from the desired minimum fixed phase lag $\phi_M$, but could even be an erroneously introduced phase lead). In any case, it is the algebraic sum of the synchronizing chopper phase shift $\phi_0$ and the phase lag, $\phi_C$, caused by the constant callibrating phase lag signal $-V_C$ that is made qual to the minimal constant phase lag $\phi_M$ caused by the detector 41 and its circuit 102. Thus, once the chopper 120 has been angularly positioned relative to the other two choppers in at least the approximately correct desired phase relationship, the potentiometer 256, 258 may then be adjusted so as to provide the right correcting voltage $-V_C$ so as to make the algebraic sum of the lag $\phi_C$ introduced thereby and the lag (or inadvertent lead) $\phi_0$ of the chopper 120 from its neutral position equal the minimum phase lag $\phi_M$ of the detector signal at, say, 104 in FIG. 1. For purposes of concreteness, it will be assumed that this "neutral" position of the chopper 120 is such that the purposefully introduced (the purpose having nothing to do with the present invention) phase lead of the synchronizing chopper 120 shown at $\theta$ in FIG. 4 is 45°, and that a small phase lag from this neutral position has actually been introduced at $\phi_0$, so that the chopper 120 actually leads the two optical choppers of FIGS. 2 and 3 by a diminished lead angle $\theta_0$, equal to $\theta - \phi_0$. In any event, the minimum phase lag in the detector signal 104, $\phi_M$, will be equal to the phase shift $\phi_0$ (positive if it is a lag and negative if it is a lead) added to the phase shift $\phi_C$ (again considered positive if it is a lag as it will invariably be) caused by the fine fixed lag voltage $-V_C$ previously described.

Although forming no part of the present invention per se, a graphical representation of how the demodulating signals at G and H may be utilized to separate out the desirable electrical components of the detector signal is given (see FIG. 8) to better clarify the manner in which the phase of the final synchronizing demodulating (or gating) signals G and H are adjusted so as to correctly demodulate the detector signal even though the detector signal at 104 in FIG. 1 may have both a constant lag and a variable lag caused by the variation in the area of the detector exposed by variation in the width of the slits 36', 38'.

EXAMPLE OF MANNER OF USE

FIG. 8 shows at I an idealized detector signal (which will really be made up of curved rather than straight line portions due to the normal characteristics of the detector and its amplifier electronics), which idealized signal generally conforms to that shown in FIG. 5 of the aforementioned published British specification and corresponding U.S. application. However, to better show the various signal components, it is assumed that the sample causes substantial absorption of the radiation passing therethrough, so that the S plus $S_0$ component is reduced in amplitude (S referring to the amplitude of the signal caused by the source radiation transmitted by (i.e., through) the sample at 25 in FIG. 1, and $S_0$ referring to the reradiated radiation from the sample, not desired to be measured) relative to R plus $R_0$ the corresponding reference transmitted and reradiated radiation, respectively); and the sample reradiation $S_0$ is assumed to be larger than the reference reradiation, $R_0$. Thus, in the waveform I in FIG. 8 each of the four equal time length signals (namely, S plus $S_0$, R plus $R_0$, $S_0$ and $R_0$) are assumed to be of different amplitude so as to better distinguish therebetween.

Directly below this idealized detector amplitude signal I is shown at H the previously referred to 90° synchronous demodulating (or gating) signal, which is utilized in this example to extract the amplitude of the radiation transmitted by the reference channel, namely, R. In the exemplary demodulation scheme of FIG. 8, the H signal comprises one-half cycle (i.e., 180°) long alternating "high" and "low" (or ON and OFF) portions, which are centered about the only one-quarter cycle (90°) long $R + R_0$ signal component of I. Therefore, the beginning of an "ON" (or "high") portion of H should lead the beginning of the $R + R_0$ component in I by the lead angle $\theta$ of 45°. This relationship, of course, is merely that of the particular exemplary demodulation scheme for the particular exemplary I signal, and does not involve the phase lags ($\phi_M$ and $\phi_S$) in the I signal and the compensating phase lags ($\phi_0$, $\phi_C$, and $\phi_V$) of the H (and G) signals, concerning which the invention is directed. The phase lag in the I signal caused by the detector at the minimum used slit width is indicated at $\phi_M$, and the additional lag in this signal caused by the slits being opened to some value above this minimum value is indicated at $\phi_S$. In the demodulating signal shown at H, the phase lags $\phi_0$ and $\phi_C$ (together equal to $\phi_M$) introduced by the angular phase lag of the chopper 120 and the (fine adjust) constant phase lag signal $-V_C$, respectively, are shown, along with the variable phase lag $\phi_V$ (caused by the variable $-V_1$ voltage) which compensates for the variable phase lag $\phi_S$ of the I signal. Thus, the constant phase shift (lag) $\phi_M$ of the I signal has been exactly compensated by the combined phase lags of the two relatively fixed phase lags $\phi_0$ and $\phi_C$, while the phase lag $\phi_S$ of the I signal which varies with the slit-width will be matched by the variable $\phi_V$ phase lag caused by the variable signal $-V_1$ generated by the slit-width phase lag circuit in the lower part of FIG. 5. Therefore, as the variable phase lag $\phi_S$ of the detector signal I changes, it will be exactly compensated by the phase shift $\phi_V$ of the synchronous demodulating or gating signals G and H so as to maintain the correct phase relationship between these two signals.

Although the particular demodulating scheme illustrated in FIG. 8 forms no part per se of the invention, this demodulating scheme is briefly described, mainly to point out the importance of maintaining the correct phase between the 0° and 90° demodulating or gating signals G and H, respectively, with the (idealized) signal I at the output of the detector amplifier at 104. Thus, the correctly phased (90°) gating signal H will allow passage of that part of the signal I as shown at J in FIG. 8, by passing those parts of the original signal I which coincide with the 180° length "ON" portions, such as 410, 412, etc.

(between the turn-on and turn-off edge portions, such as shown at 250, 250'). During the "OFF" portions of the gating signal H, such as shown at 411 and 413, the signal I will be suppressed (or sent to a different circuit) so as to not appear on the lead containing the J signal. As may then be seen from a comparison of signals I and J, each cycle of the J signal will comprise a one-half portion of the S plus $S_0$ component, the full R plus $R_0$ component, and a one-half portion of the $S_0$ component, and will contain no signal (i.e., zero signal) during the remaining parts of the cycle.

The same original signal I may then be inverted (i.e., made negative) as by being fed by lead 418 to inverter 420, so as to appear on the output 422 (see FIG. 1) as a −I signal as shown in FIG. 8. This inverted signal −I may then be gated by a signal identical to the gating signal H except for also being inverted, as indicated at −H (equivalent to the well-known logic symbol $\overline{H}$), so that a signal having the form shown at K in FIG. 8 will be generated, since the −H signal will pass only those parts of the −I signal that concur with the "ON" or high portions such as 430, 432, etc. of the −H gating signal. Specifically, the K signal will contain (all as a negative signal) a portion equal to one-half $S_0$, a portion equal to $R_0$, and a portion equal to one-half of S plus $S_0$ during each full cycle, as indicated generally at 434, 436 for two complete cycles of the K waveform in FIG. 8. Combining (i.e., adding) the J and K signals in FIG. 8 will yield a composite signal of the form illustrated at J+K in FIG. 8. Any one complete cycle of this J+K signal, as indicated, for example, between points 440 and 442 (or indeed any correspondingly spaced points, representing one cycle of the original signal), obviously will contain equal amplitude positive and negative signals having the paired values of +½ (S+$S_0$) and −½(S+$S_0$), and +½$S_0$ and −½$S_0$. Therefore, the d.c. value of the combined signal J plus K as indicated by signal M will contain no net component of either the (S+$S_0$) or the $S_0$ signal component originally present. It may be also noted in passing that the original R+$R_0$ component at 450 in the J signal and therefore still present at 450' in the combined J+K signal and the −$R_0$ component (at 452) in the K signal, shown at 452' in the combined J+K waveform are of opposite sign so that the net d.c. signal M will actually comprise only signals equal to (R+$R_0$ minus $R_0$ and therefore) R as indicated by the full line signal component 460 at M in FIG. 8. However, the +$R_0$ component and the −$R_0$ component are indicated by dotted line signals 462 and 464, respectfully, to indicate that the original signal 450' has been diminished by the amount $R_0$ whereby the signal 460 actually present has been compensated or freed of background reradiation from the reference channel, so that the actual signal present at 460 is proportional to only the radiation actually transmitted through the path from the original source (this compensation against reference path or channel reradiation or background being more fully described and claimed in the aforementioned published British specification and corresponding U.S. application).

Merely for purposes of completeness, it is pointed out that, rather than actually suppressing or discarding the parts of the original signal I during the OFF portions such as 411, 413, etc., of the positive gating signal H and similarly suppressing or discarding the other portions of the inverted signal −I during the alternate "OFF" portions 431, 433, etc., of the inverted gate signal −H, these previously assumed to be suppressed portions can instead be added to each other so as to form signals analogous to but of opposite sign to those shown at J and K, which, when combined (in the manner analogous to that shown at J+K), will supply a net d.c. signal of the type shown at −M. Such an arrangement allows two readouts (supplied to, for example, a chart recorder and a meter, respectively). If preferred, the two R signal components in the M AND −M signals may be added, by first reinverting the −M signal and then adding it to the M signal. Alternatively, the original gating signal H may be utilized in a manner analogous to a switch, for example, at point 469 in FIG. 1, to alternately pass those parts of the original I signal corresponding to the ON portions (410, 412, etc.) of the H signal directly to the demodulator, while passing the other portions of the I signal occuring during the "OFF" portion 411, 413, etc. of the H signal to an inverter (such as 420) and then recombining the signals so as to obtain signals directly analogous to the J+K signal and therefore the net d.c. signal M already described.

In a manner exactly analogous to that described relative to the 90° synchronous demodulation gating signal H for extracting the reference channel (and, in particular, the transmitted reference radiation signal R alone), the 0° gating signal G, shown in both FIGS. 6 and 8 may be utilized to perform the same operations on the original signal I. This will isolate as shown at signal N in FIG. 8 the sample transmitted radiation signal S (at 470, 472, etc.) entirely free of not only all reference radiation (that is, any R or $R_0$ components), but also compensated for reradiation in the sample channel, which would otherwise appear as the dotted line signal $S_0$ at 474, 476, etc., except for the fact that it has been subtracted out because of the presence of the compensating −$S_0$ signals indicated by dotted lines at 484, 486, etc. (in a manner exactly analogous to that described relative to the similar reradiation or background signals $R_0$ shown in dotted lines in the M signal previously described).

Although the exact manner of extracting the various signals in the demodulator (schematically shown at 106 in FIG. 1) forms no part of the present invention, a typical scheme has been graphically illustrated in FIG. 8 to better point out why both the "fixed" time lag $\phi_M$ and the variable time lag $\phi_S$ in the original I signal must be exactly compensated for in the two gating signals G and H, namely, by compensating for the fixed phase lag $\phi_M$ in signal I by the combined coarse adjustment of the chopper 120 providing the $\phi_0$ shift (which may be positive or negative) and the additional finely adjustable fixed or calibration time lag $\phi_C$ (provided by adjustment of the voltage −$V_C$ in FIG. 5), and, more importantly relative to the present invention, providing an automatic compensation for the variable phase lag $\phi_S$ in signal I by the variable phase lag $\phi_V$, provided by the varying voltage −$V_V$ in a manner completely described above.

PHASE ERROR

To illustrate the importance of this phase lag compensation, the exemplary combined signal J+K in FIG. 8 may be inspected to show what the effect of any substantial undesirable phase error will cause. If no variable phase lag $\phi_V$ were provided as the area of the detector increased for the increasing slit-width, there would be no $\phi_V$ lag in the H (or G) gating signal to compensate for the $\phi_S$ phase lag of the I signal, so that this gating signal H would be somewhat to the left from its ideal position as shown in FIG. 8. This would cause the composite signal J+K to contain a positive component generally at 480, larger than ½(S+$S_0$), by "widening" the amount of the signal that was passed (that is, its starting line 482 would move to the left and therefore the total area of signal 480 would increase). At the same time, the (intended to be equal except for a sign) −½(S+$S_0$) desired signal shown, for example, at 481, 483, would be diminished in absolute value since line 482' (a continuation of line 482) would also, of course, move to the left. This error in phase lag would therefore cause a spurious or error signal in the net d.c. signal, as indicated at 490, 490' in the net d.c. signal M. In particular, such error signal would have the amplitude of S+$S_0$ and a width equal to twice the phase error (that is, 2$\phi_S$ and therefore 2$\phi_V$) if no compensation for the lag in the slit-width variation is provided. Although such incomplete phase lag compensation would also provide a small (partially) off-setting error by causing in effect the other gating or switching line 485, 485' in the J+K signal also to move to the left, thereby reducing the (width of the) positive signal component 484 to less than ½ $S_0$ while increasing the (width and therefore the) total signal content of the minus signal component at 485 to more than −½ $S_0$, there would still be a net resulting error. This may be seen by the fact that the error instroduced by the wrong phasing at 485, 485' would supply a negative error, indicating at 493 in the net d.c. signal M having an amplitude of $-S_0$ and a width of twice that of the phase error, (i.e., $2\phi_S$). Thus, the resultant error would be the algebraic sum of (difference between) the amplitudes of $S+S_0$ and $-S_0$, times twice the phase lag error that was not compensated. Thus, the resultant error signal in the net d.c. signal M would be that part of the signal 490 below the horizontal line 495, equal to S times twice this phase error, only the part 496 of the error above line 495 being compensated by the opposite sign but smaller amplitude error component 493. Thus, failure to provide the proper phase lag in the phasing of the H synchronous demodulating or gating signal would effectively add a (positive) spurious signal to the reference channel, which spurious signal was proportional to the amplitude of the sample signal (multiplied by twice the phase lag error) in this exemplary type of demodulation.

Obviously an analogous undesirable "reference" signal contribution would appear in the sample channel signal at N in FIG. 8, but in this case, the "added" spurious signal would be negative and similarly proportional to the reference signal. In general, some error of this type (i.e., undesirably allowing a part of signal components intended to be separated into the "-wrong" channel) will be introduced in almost any demodulation scheme by faulty phasing of the demodulation, since the sample and reference signals must be separated by a correctly-timed demodulating or gating signals if undesirable "cross-talk" is to be avoided.

Since the above explanation is based on treating the detector output signal (at 104) I as a true square wave signal, each of the four different parts have been treated as completely separable signal components. As previously noted, the combined effect of the detector 41 and its pre-amplifier 102 will actually cause rounding of such ideal square waves. Nevertheless, the analysis of both ideal (in phase) demodulation and the error introduced by a faulty phase relationship between the signal (I) and its demodulating signals (G, H) remains valid for such non-ideal signal components. In general, since the demodulation occurs at a frequency (say, $f$) equal to the repetition frequency of a complete four-part signal of I, phase error will cause mixing or cross-talk of those signal components having this basic frequency (that is, the sample and reference signals, S and R, respectively). On the other hand, since the sample and reference background signal components ($S_0$ and $R_0$, respectively) occur twice in each complete period of the signal I (i.e., both as part of $S+S_0$ and at $S_0$ and as part of $R+R_0$ and at $R_0$ ), so as to have a frequency of $2f$, demodulation at the single $f$ frequency of the type described will cause complete compensation or elimination of these background components even if the demodulation signals have some phase error. Thus, although in the previous explanation utilizing ideal square waves, the $S_0$ contributions caused by phase error (namely, at 493 and that part 496 of 490 above line 495) are treated as equal but opposite signals in the final reference channel M, an alternative way of stating the effect of phase error would be to consider the background ($2f$) signal components as being always absent from the final channel M (and, analogously, channel N) regardless of phase error in the demodulating signals relative to the detector signal I. Thus, for reasons analogous to the previously described showing of the $R_0$ signals (in dotted lines) of 462 and 464 in M of FIG. 8, the error signals 493 and 496 have been indicated in the final d.c. reference channel signal M, even though (since their net d.c. sum is zero), components 493 and 496 form no part of the d.c. signal M (even when there is a phase error) but merely help illustrate that the error signal at 490 has a "height" only to line 495 (i.e., equal to S) and does not contain the part 496 above line 495. However, not only in the exemplary signal and demodulating technique, but in all conventional techniques for separating detector signals into two channels, errors in each channel will be introduced for signal components occurring at the fundamental frequency of the detector signal (e.g., S and R), since this is also the fundamental frequency of the demodulating signals as well.

Thus, although the inventive technique of providing a variable (as well as initial or calibrating) phase lag in the synchronous demodulating or gating signals (G, H) has been illustrated in conjunction with a relatively complex signal (I) and demodulation scheme, the invention may be utilized in essentially all types of optical instruments in which a single detector is utilized, and its output must be separated or demodulated synchronously to extract the information desired, where a variable phase shift in the detector signal to be separated occurs (e.g., because of variation in the slit-widths or other limiting aperture of the instrument). A relatively sophisticated instrument of the double-beam type, utilizing a relatively sophisticated beam-switching technique has been shown for exemplary purposes to explain the manner in which the invention both may be incorporated in the instrument and solves the problems that would be caused by such a phase shift in the detector signal. However, in essentially all double-beam instruments of the type using a single detector, some means for separating (i.e., synchronously demodulating) the signal components are required, and error in the relative phase between the detector signal components and the demodulating signal schematically illustrated at 110 in FIG. 1 will typically cause the same type of problems, typically by allowing cross-talk between the signals intended to be separated by the appearance of at least part of the "wrong" signal as well as the "-correct" signal (the "correct" signal in each channel may also be undesirably diminished in some demodulation schemes) in each channel. Although the exemplary instrument is indicated as ratioing the pure reference transmitted signal R (at lead 112) and the pure sample signal S (at lead 114) so as to supply a signal at output 502 to any readout (for example, a chart type recorder) at 504, the problem solved by the invention is both useful and important in any type of instrument regardless of how the extracted signals are intended to be used. In other words, if the two channels intended to be compared (by ratioing, by subtracting, or even by nulling) contain unknown errors contributed by mixing or cross-talk from the other channel, the final quantity obtained will in general be inaccurate, (except for the rare case where the cross-talk error signal components cause each channel to remain identical in amplitude to that before such cross-talk). Thus, the invention may be advantageously utilized in substantially any type of instrument utilizing a single detector and any type of demodulating means for extracting from the output thereof any type of different time-varying signal components.

What is claimed is:

1. In an optical instrument of the type in which a radiation detector receives sequentially at least two different radiation beams and therefore generates at its output an electrical signal containing, in time sequence, electrical components proportional to the intensities of said two different radiation beams, and means for generating a final synchronous demodulating signal for effectively separating said electrical components of said detector output electrical signal;
   said detector being of the type having an electrical output signal which shifts in time according to the size of the detector area receiving radiation over at least some range of sizes of said detector area;
   means for effectively changing said detector area receiving radiation from both said radiation beams;
   and means connected to said detector area changing means for causing a variable phase shift in said final synchronous demodulating signal utilized for separating said electrical components in accordance with the size of the area of said detector receiving radiation, so as to compensate for the time shift in said components of said detector signal caused by said changing of said detector area.

2. An optical instrument according to claim 1, in which:
   cyclically operating beam switching means causes said detector to receive sequentially said two different radiation beams from two different optical paths;

a signal generating means connected to said beam switching means for generating a first synchronous signal having the same period and a fixed phase relationship to said cyclically operating beam switching means;

and said variable phase shift means is connected to receive said first synchronous signal and cause said variable phase shift therein so that said final synchronous demodulating signal is compensated for said time shift in said detector signal components caused by said changing detector area receiving radiation.

3. An optical instrument according to claim 2, in which:

an additional manually adjustable means is provided for causing an adjustable, additional fixed phase shift between said first synchronous signal and said final synchronous demodulating signal;

whereby said final synchronous demodulating signal may be initially adjustably calibrated to compensate both for any small undesired difference in phase relationship between said beam switching means and said signal generating means, and for any fixed phase lag caused by the various parts of said instrument, including said detector.

4. An optical instrument according to claim 1, in which:

said means for generating said final synchronous demodulating signal comprises means for generating two different synchronous gating signals in each cycle of said final synchronous demodulating signal;

and said variable phase shift means comprises means for simultaneously shifting both of said two gating signals together by the same amount;

thereby maintaining the same relative phase relationship between said gating signals, when the entire final synchronous demodulating signal is compensated for said time shift in said detector signal components caused by said changing detector area.

5. An optical instrument according to claim 4, in which:

said means for generating two gating signals comprises means generating a repetitive linear ramp voltage, and a pair of voltage comparison means each determining when said ramp voltage crosses each of two different fixed voltages and initiating one of said gating signals at such time;

said variable phase shift means comprises means for adding a d.c. voltage to said linear ramp voltage, thereby equally changing by the same amount d.c. voltage of all points on the resulting modified linear ramp voltage;

whereby each of the crossing points of said resulting modified linear ramp voltage with each of said fixed voltages will be shifted by the same amount of time, so that both gating signals are shifted in phase by the same amounts.

6. An optical instrument according to claim 1, in which:

said means for effectively changing said detector area receiving radiation comprises means for continuously changing said area;

means for supplying a continuous indication of the position of said continuously changing means connected thereto ;

said variable phase shift means being connected to said indication supplying means to receive said continuous indication and to cause said variable phase shift in said final synchronous demodulating signal in accordance with said continuous indication.

7. An optical instrument according to claim 6, in which:

said continuous indication supplying means comprises a variable electrical device, the variable electrical output of which provides said continuous indication of said continuously changing means according to a first mathematical relation;

said output signal of said detector shifting in time according to said size of detector area receiving radiation according to a second mathematical relation, different from said first mathematical relation;

and said variable phase shift means comprises circuit means for converting said variable electrical output of said continuous indication supply means following said first mathematical relation to a variable phase shift electrical signal according to a function which is at least substantially proportional to said second mathematical relation;

said variable phase shift means further comprises means for causing a phase shift in said final synchronous demodulating signal at least proportional to said variable phase shift electrical signal;

whereby said final demodulating signal is compensated by a phase shift in accordance with substantially the same second mathematical relation as the time shift in said detector signal, caused by said changing of said detector area receiving radiation.

8. An optical instrument according to claim 7, in which:

said converting circuit means comprises means for sequentially altering the effective gain of said circuit means at a plurality of different value ranges of said variable electrical output of said continuous indication supply means.

9. An optical instrument according to claim 8, in which:

said sequential gain altering means comprises a plurality of branch circuits in mutually parallel arrangement;

each of at least some of said branch circuits comprising an electrical impedance and switching means for opening and closing each said branch circuit;

each of said effective switching means being of such construction and so connected as to close its respective branch circuit at a different particular value of said variable electrical output of said continuous indication supply means;

whereby the effective net overall impedance of said parallel branch circuits of said gain altering means is changed when each of said switching means closes, so as to cause changes in the effective overall gain of said converting circuit means at each of said particular values of said variable electrical output of said continuous indication supply means.

10. An optical instrument according to claim 9, in which:

each of said electrical impedances comprises a variable resistance means;

whereby individual adjustment of said impedances causes said gain altering means to approximate the desired proportional gain between each of said particular values of said variable electrical output of said continuous indication supply means, so that said converting circuit can be adjusted to cause said variable phase shift electrical signal at least to approximate proportionally to the specific second mathematical relationship of time shift of a specific detector.

11. An optical instrument according to claim 8, in which:

said converting circuit means further comprises overall gain adjusting means effectively in series with said sequential gain altering means, for providing an overall gain factor for equally changing all utilized values of said variable electrical output of said continuous indicator supply means, thereby proportionally changing the amplitude of the variable phase shift electrical signal at all utilized values thereof.

12. An optical instrument according to claim 8, in which:

said converting circuit means further comprises means for effectively limiting the maximum value of said variable phase shift electrical signal;

said limiting means being adjustable to set said maximum value to correspond to the maximum shift in time of said detector output signal.

* * * * *